United States Patent

Takatori

[11] Patent Number: 5,495,310
[45] Date of Patent: Feb. 27, 1996

[54] LENS-FITTED PHOTO FILM UNIT

[75] Inventor: Tetsuya Takatori, Kanagawa, Japan

[73] Assignee: Fuji Photo Film Co., Ltd., Kanagawa, Japan

[21] Appl. No.: 165,939

[22] Filed: Dec. 14, 1993

[30] Foreign Application Priority Data

Dec. 16, 1992 [JP] Japan .................................. 4-336034

[51] Int. Cl.$^6$ ............................ G03B 17/02; G03B 17/26
[52] U.S. Cl. ............................................. 354/288; 354/275
[58] Field of Search ..................................... 351/272, 288, 351/275, 173.1, 173.11

[56] References Cited

U.S. PATENT DOCUMENTS

| | | | |
|---|---|---|---|
| 4,965,600 | 10/1990 | Smart et al. | 354/212 |
| 5,063,400 | 11/1991 | Takei et al. | 354/288 |
| 5,079,579 | 1/1992 | Pagano et al. | 354/288 |
| 5,231,438 | 7/1993 | Smart | 354/281 |
| 5,248,108 | 9/1993 | Zander | 354/275 |
| 5,319,406 | 6/1994 | Takatori | 354/275 |
| 5,363,166 | 11/1994 | Takahashi et al. | 354/275 |
| 5,363,167 | 11/1994 | Takatori | 354/275 |

Primary Examiner—Michael L. Gellner
Assistant Examiner—Nicholas J. Tuccillo
Attorney, Agent, or Firm—Sughrue, Mion, Zinn, Macpeak & Seas

[57] ABSTRACT

A lens-fitted photo film unit has a pre-loaded cassette. A roll of unexposed photo film is drawn out of the cassette. After photography, an exposed portion of the photo film is wound into a cassette shell around a spool. A stopper level, inside the cassette shell, is swingable from a position of latching the spool immovably on the cassette shell, to a position of unlatching. A shutter plate, inside a photo film passage port in the cassette, closes to block ambient light from entering the passage port, and opens the passage port to allow photo film to pass. A bottom lid closes a cassette containing chamber. A lock slider is mounted in the bottom lid in order to lock and unlock the bottom lid on the chamber. The stopper lever is connected to the lock slider, and latches the spool while the bottom lid is unlocked, and leaves the spool unlatched while the lock slider locks the bottom lid. A rear lock bar on the bottom lid locks and unlocks the bottom lid. The rear lock bar is engaged with the shutter plate, and closes the shutter plate while the bottom lid is unlocked, and opens the shutter plate while the rear lock bar locks the bottom lid. A pointer is disposed on an end of the spool. An associated face of the cassette shell has four indicative areas, and are pointed by the pointer, to indicate one of four graded statuses of use of the photo film.

31 Claims, 8 Drawing Sheets

LENS-FITTED PHOTO FILM UNIT

BACKGROUND OF THE INVENTION

1. Field of the Invention

The present invention relates to a lens-fitted photo film unit, more particularly to a lens-fitted photo film unit in which, before loading and after unloading of a cassette, photo film is reliably protected from unwanted exposure to ambient light.

2. Description Related to the Prior Art

Lens-fitted photo film units (hereinafter referred to simply as film units) are now on the market, e.g. under the trade name "Fujicolor Quick Snap" (manufactured by Fuji Photo Film Co., Ltd.). Such known film units are a single-use camera pre-loaded with a photo filmstrip (hereinafter referred to as film). A user who has purchased the film unit winds the film frame by frame back into the cassette after each exposure. The film unit in its entirety is forwarded to a photo laboratory after use.

The photo film unit is pre-loaded with the conventional 135-type photo film cassette similar to what is used in a conventional camera, and includes a cassette shell which is constituted of a tube formed from a thin metal plate and a pair of end caps. The photo film is retained on a spool formed from resin. The spool is contained in the cassette shell rotatably. A film passage port is formed in the cassette shell. The photo film is drawn out of the passage port while wound as a roll. Plush or light-trapping ribbons are attached to the inside of the passage port, so as to prevent ambient light from entry into the cassette shell through the passage port.

In such a metal-shell cassette containing 135 photo film, a leading end of photo film is protruded from inside a cassette shell even before use of the photo film. To load a camera with the cassette, a user is required to handle the cassette while paying attention not only to the cassette shell but to the protruded leading end. To overcome these difficulties associated with handling the conventional photo film cassette at the time of inserting it into a camera, a cassette has been proposed in which not only a roll but a leading end of photo film is pre-contained in a cassette shell, and rotation of a spool causes the leading end to advance to the outside of the cassette shell, upon separation from the roll by a separator structure disposed in an innermost position along and inside the passage port. It is also known, to use an openable resinous light-shielding member for preventing light from entering the inside of the cassette shell through a passage port for the photo film, instead of the plush.

It is also known to construct a mechanism inside a cassette for regulating a spool in latched and unlatched positions. Should a cassette be vibrated or shook in transportation or manual handling, a roll of photo film therein will be loosened. A photosensitive surface of the photo film can thus be scratched, after turns of the photo film lying one on another, or else the photo film and a cassette shell, have contacted each other. Should the cassette be of a leader-exiting type, even rotation of the spool will fail to exit a leading end from the cassette because the position of the leading end inside the cassette will be deviated inappropriately from a desired position. In order to cope with those difficulties, the known spool-regulating mechanism latches the spool so as to stabilize the entire orientation of the photo film.

In view of use in a lens-fitted photo film unit, it is desirable to provide such a leader-exiting structure and spool-regulating mechanism for a photo film cassette. This is because it is favorable to conceive various uses of the cassette. For example, the cassette, after exposure of the photo film, could be loaded into an automatic photo film processor or an automatic photo printer while containing the exposed photo film; and after development of the photo film, the cassette could be loaded into a known photo film video player while containing the developed photo film, so as to use the photo film while drawing it out of the cassette. A "photo film video player" is an instrument for picking up an on the photo film to display a positive image of the image from the photo film on a CRT.

Any photo film cassette, after being removed from a packaging or a photo film unit, does not readily indicate the status of the photo film inside, either unexposed, exposed or developed, because the status of the photo film cannot be discerned externally. Nowadays there is a proposal that external apparatuses for use with the photo film be adapted to loading with the entirety of the photo film cassette containing the photo film. It is conceivable to load a wrong apparatus with the cassette, e.g. load a camera with a cassette containing exposed photo film, resulting in double exposure, or load the processor with a cassette containing the developed photo film. The cassette containing the photo film of any status of being unexposed, exposed and developed, therefore, requires prevention of these errors in manual handling.

U.S. Pat. No. 4,965,600, in view of such a situation, discloses a photo film cassette, and a camera for use with the same, in which a status of photo film in the cassette is indicated externally as one of being Completely Unexposed, Partly Exposed or Completely Exposed.

However, the openable passage port, having the light-shielding member as described above, might admit ambient light into the cassette shell and would subject the photo film in the cassette to light even after photography. The known cassette having the resinous shell has such a disadvantage. The exposed photo film is withdrawn from the cassette which has been unloaded from the photo film unit. Prior to unloading the cassette from the photo film unit, the light-shielding member of the cassette placed in the illuminated room must be kept closed tightly by external operation. If the exposed photo film is handled in the darkroom before withdrawal from the photo film unit, this results in low efficiency and inconsistency of processing of photo films with accumulated cassettes.

It follows that the above mentioned difficulties of the resinous cassettes make it difficult to take advantage of the idea of incorporating a leader-exiting structure in such a cassette. Should a cassette lack a leader-exiting structure, the cassette must be disassembled or broken before the photo film can be loaded into a photo film processor or printer. Thus automation in loading such devices with the photo film is unavailable, so that improvement in efficiency is limited.

The construction disclosed in U.S. Pat. No. 4,965,600 has also a problem in that the photo film unit to be used with the cassette must incorporate a complicated arrangement inclusive of a device for driving the indication for the status of the photo film, a device for driving the spool, and a double exposure preventive device for avoiding loading of the cassette which contains the exposed photo film. This is unfavorable in terms of a lack of consistency of a photo film unit. Also, the relevant devices are large in dimension and the devices expensive to manufacture.

SUMMARY OF THE INVENTION

In view of the foregoing problems, an object of the present invention is to provide a lens-fitted photo film unit in which, before loading and after unloading of a cassette, photo film is reliably protected from unwanted exposure to ambient light.

Another object of the present invention is to provide a lens-fitted photo film unit in which can fully take advantage of a leader-exiting cassette.

Still another object of the present invention is to provide a lens-fitted photo film unit in which a cassette which has been unloaded from the photo film unit is easily discernible from one that has not been loaded into a photo film unit.

In order to achieve the above and other objects and advantages of this invention, a lens-fitted photo film unit has shutter means, which is disposed in a photo film passage port, and when in a closed state, blocks the passage port to prevent ambient light from entry into a cassette shell, and when in an open state, allows photo film to pass through the passage port. When a spool is rotated in an unwinding direction, a leader of the photo film is exited through the passage port. After photography, an exposed portion of the photo film is wound into the cassette shell. A bottom lid closes a bottom of a cassette containing chamber in light-tight fashion, and is removed from a housing, before a cassette is moved in an axial direction and unloaded from the cassette containing chamber.

First lock means is disposed on the bottom lid, to be externally operable and displaceable between retaining and unretaining positions. When in the retaining position, the first lock means contacts a wall of the cassette containing chamber to retain the bottom lid on the housing. When in the unretaining position, the bottom lid is released from retention on the housing. The first lock means is engaged with the shutter means, and when in the unretaining position, moves the shutter means to the closed state, and when in the retaining position, moves the shutter means to the open state. The first lock means is operated and displaced to the unretaining position after the photo film is wound into the cassette shell, so as to close the shutter means.

Second lock means is disposed on the bottom lid, to be externally operable and displaceable between retaining and unretaining positions. When in the retaining position, the second lock means contacts the wall of the cassette containing chamber to retain the bottom lid on the housing. When in the unretaining position, the bottom lid is released from retention on the housing.

Spool latching means is disposed inside the cassette shell in a displaceable fashion between a latching position where the spool is latched relative to the cassette shell, and an unlatching position where the spool is unlatched. The spool latching means is connected to the second lock means, and is displaced to the latching position when the second lock means is in the unretaining position, and is displaced to the unlatching position when the second lock means is in the retaining position.

Before loading and after unloading of a cassette, photo film can be reliably protected from unwanted exposure to ambient light. Prior to unloading the cassette from the photo film unit placed in an illuminated room, the shutter member of the cassette can be kept closed tightly with ease, upon the operation of unlocking the bottom opening. Even with many photo films unloaded from accumulated photo film units, low efficiency will not be a problem even with external optical instruments.

The cassette for the novel photo film unit can have a leader-exiting structure, which can be taken advantage of by the present invention. The cassette-accompanied automation in loading such external instruments with the photo film can be utilized with the cassette from the novel film unit, without disassembling or breaking the cassette.

In a preferred embodiment, third lock means is disposed on the bottom lid, to be externally operable and displaceable between retaining and unretaining positions. When in the retaining position, the third lock means contacts a wall of the cassette containing chamber to retain the bottom lid on the housing. When in the unretaining position, the bottom lid is released from retention on the housing. The third lock means is engaged with an axial end of the spool, and when displaced, transmits rotation to the spool.

Indicator means is disposed on an end face of the cassette directed to the bottom lid, and is provided for the spool and the cassette shell to indicate a status of use of the photo film. The indicator means includes a pointer and a plurality of indicative areas, which represent graded statuses of use of the photo film, to be pointed by the pointer. One of the indicative areas is pointed to in accordance with displacement of the third lock means.

Further, signaling means is provided in the cassette, to signal a rotational position of the spool externally before and/or after the cassette stands loaded in the cassette containing chamber. The rotational position represents a status of use of the photo film.

A cassette unloaded from the photo film unit is easily discernible from one which has not been loaded into a photo film unit. Portability and low cost of a photo film unit can thus be consistent with the auxiliary devices associated with the structure for indicating the statuses of use of the photo film.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
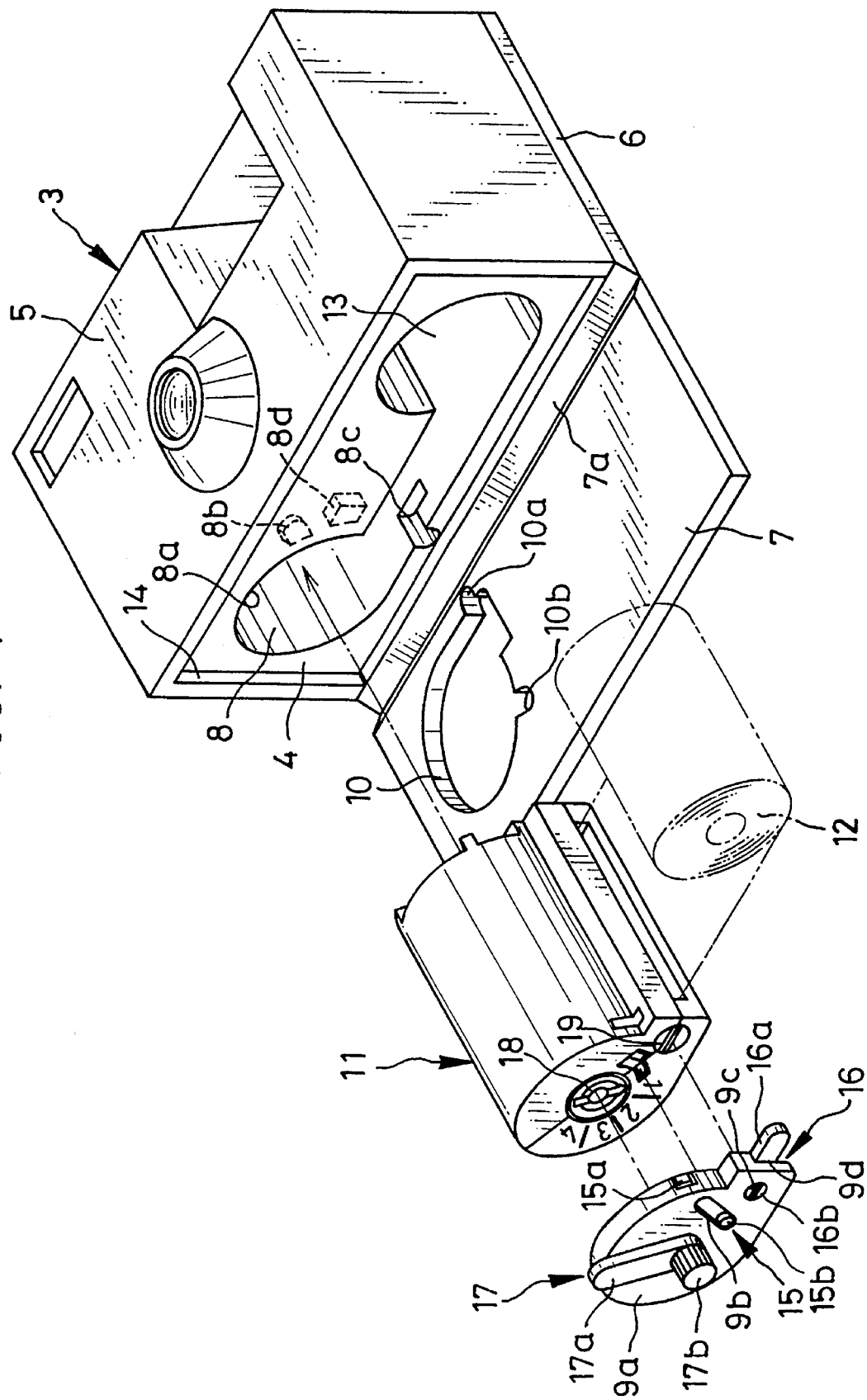
FIG. 1 is an exploded perspective view illustrating a lens-fitted photo film unit according to the present invention.

In FIG. 1 illustrating a lens-fitted photo film unit, a photo film housing 3 receives a cassette 20 to be loaded therein.

The housing 3 is constituted of a main body 4, a front cover 5 and a rear cover 6 which are secured to, and sandwich, the main body 4. The main body 4 comprises a resin-formed base, which incorporates a shutter mechanism inclusive of a shutter blade and a one-frame advancing mechanism for advancing a photo film by one frame at a time. The front cover 5 covers the shutter mechanism on the main body 4. The rear cover 6 covers the rear of the main body 4 in light-tight fashion, while keeping photo film on a focal plane for exposure by contacting the photo film. The rear cover 6 is formed with a bottom plate 7 which covers the bottom of the main body 4. The bottom plate 7 is connected to the rear cover 6 via a thinly formed hinged portion 7a, and is thus openable from the main body 4. The main body 4 has a cassette containing chamber 8, under which an opening 10 is formed in the bottom plate 7, opening 10 is adapted to receive the periphery of a bottom lid 9a.

The cassette containing chamber 8 has an opening 8a, into which a cassette shell 11 is inserted. In the main body 4 is formed a supply chamber 13, which is loaded with a roll of photo film 12. The cassette containing chamber 8 has a size which is slightly greater than the exterior of the cassette shell 11, and keeps the cassette shell 11 immovable inside the main body 4 after insertion into the cassette containing chamber 8. After the bottom plate 7 is closed, a spacing 14 is formed between it and the main body 4.

The bottom lid 9a is tightly fitted in the opening 8a, and prevents ambient light from entering the cassette containing chamber 8. The bottom lid 9a is provided with a lock slider 15 associated with a stopper lever 28 (see FIG. 4), a swingable rear lock bar 16 associated with a light-shielding shutter plate 19 of the cassette 20, and a swingable central lock bar 17 associated with the spool 18.

The lock slider 15 is mounted in a groove 9b formed in the bottom lid 9a, and when operated, sets the bottom lid 9a locked and further sets the spool 18 to be rotatable or immovable. The lock slider 15 has a bottom lid locking end 15a to be inserted into a groove 8b in the cassette containing chamber 8. An operable projection 15b is formed on the lock slider 15 and is operable by use of an engaging jig. When the lock slider 15 is slid by the jig, the locking end 15a is projected through the periphery of the bottom lid 9a, and inserted in the groove 8b to lock the bottom lid 9a. The lock slider 15 also has an engaging pin 15c (see FIG. 2) projected into the cassette containing chamber 8. The pin 15c is engaged with a stopper lever 28 contained in the cassette shell 11.

The rear lock bar 16 is mounted in a hole 9c and a recess 9d formed in the bottom lid 9a, and when operated, sets the bottom lid 9a locked and further sets the shutter plate 19 selectively to open and closed positions in a passage port 31. The rear lock bar 16 has a bottom lid locking end 16a. A groove 16b is operable by use of a jig or screwdriver. When rear lock bar 16 is rotated by the jig, the locking end 16a is projected outward from the bottom lid 9a to lock the bottom lid 9a. When the rear lock bar 16 is rotated in the releasing direction, the locking end 16a is rotated in a groove 8c inside the cassette containing chamber 8 until locking end 16a comes to a notch 10a, upon which the shutter plate 19 is closed at the same time as the bottom lid 9a is released from retention. Note that the rear lock bar 16 has an engaging end 16c projected into the cassette containing chamber 8 (see FIG. 2). The engaging end 16c is engaged with the shutter plate 19 for transmitting rotation thereto.

The central lock bar 17 is mounted in a central hole formed in the bottom lid 9a, and when operated, sets the bottom lid 9a locked in position and further changes the rotational position of the spool 18. The central lock bar 17 has a bottom lid locking end 17a to be fitted in the spacing 14 under the main body 4 and over the bottom plate 7. A wheel 17b formed on the central lock bar 17 is rotated manually, or grasped automatically. When the central lock bar 17 is rotated in the releasing direction, the locking end 17a is rotated until locking end 17a comes to a notch 10b, upon which a pointer 35 (see FIG. 7) is directed differently at the same time as the bottom lid 9a is released from retention. Note that the central lock bar 17 has a key shaft 17c projected into the cassette containing chamber 8 (see FIG. 2). The key shaft 17c is engaged with the spool 18 for transmitting rotation thereto.

Figure 3:
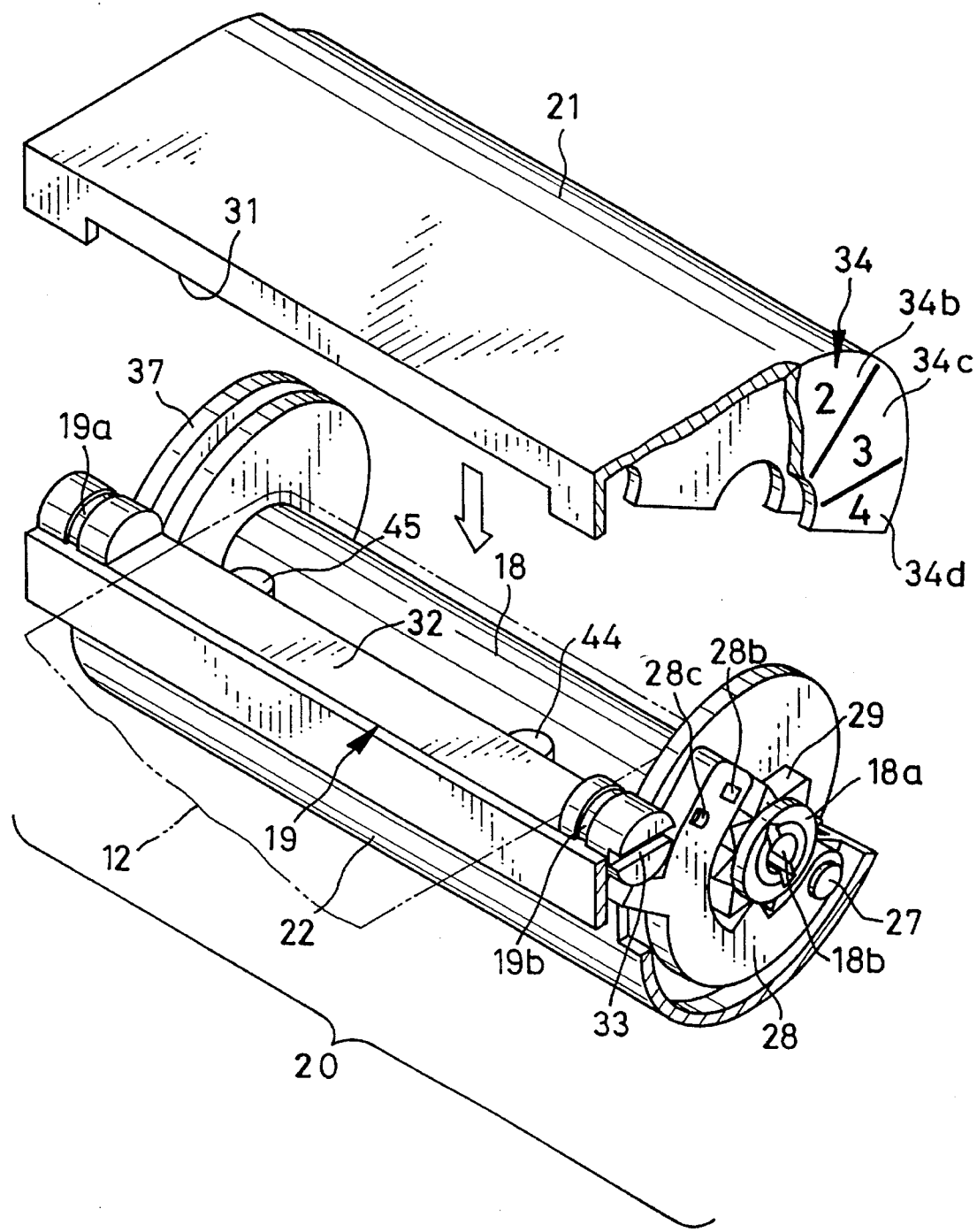
FIG. 3 is an exploded perspective view illustrating the cassette in FIG. 2.
Figure 4:
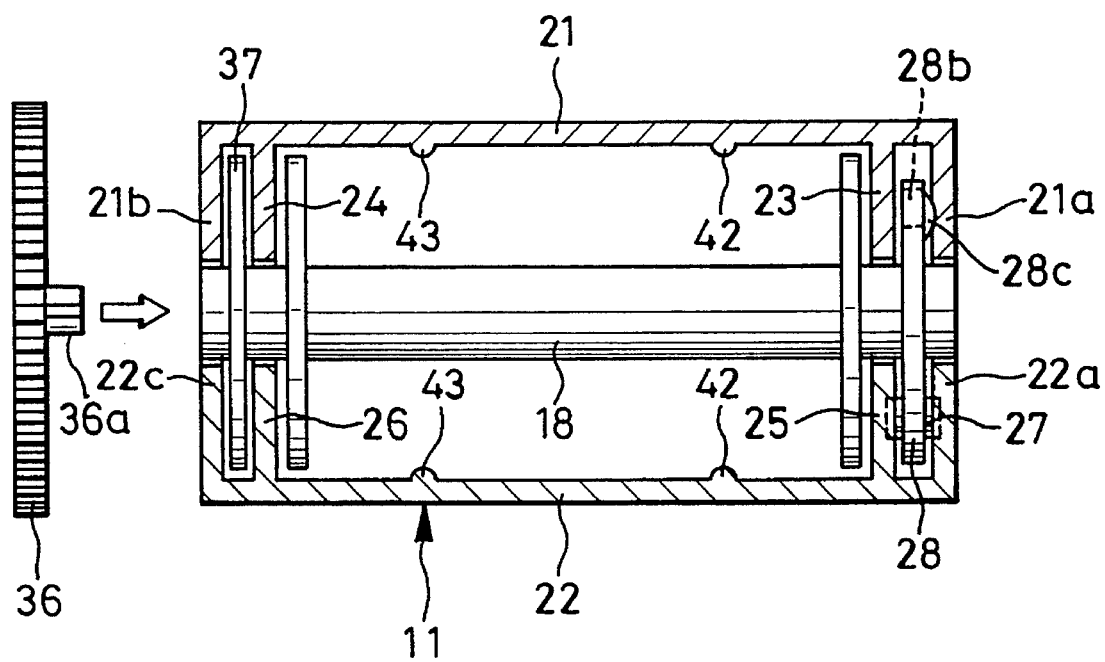
FIG. 4 is a longitudinal section illustrating the cassette, together with an operable winding wheel.

The photo film cassette 20, as illustrated in FIGS. 3 and 4, is constituted of the cassette shell 11, the rotatable spool 18, and the spool-retained photo film 12. The cassette shell 11 is constituted of shell halves 21 and 22, and contains the shutter plate 19 and the stopper lever 28. The inside of the shell halves 21 and 22 have a pair of ridges 42 and 43, which contact on the outer turn of the roll of the photo film 12 so as to keep the roll from loosening. In the innermost position in the passage port 31, there are disposed separator claws 44 and 45, which abut on a leading end 12a of the photo film 12 so as to separate the leading end 12a from the inner roll of the photo film 12 and direct the leading end 12a to the outside of the cassette shell 11 through the passage port 31.

Figure 5A:
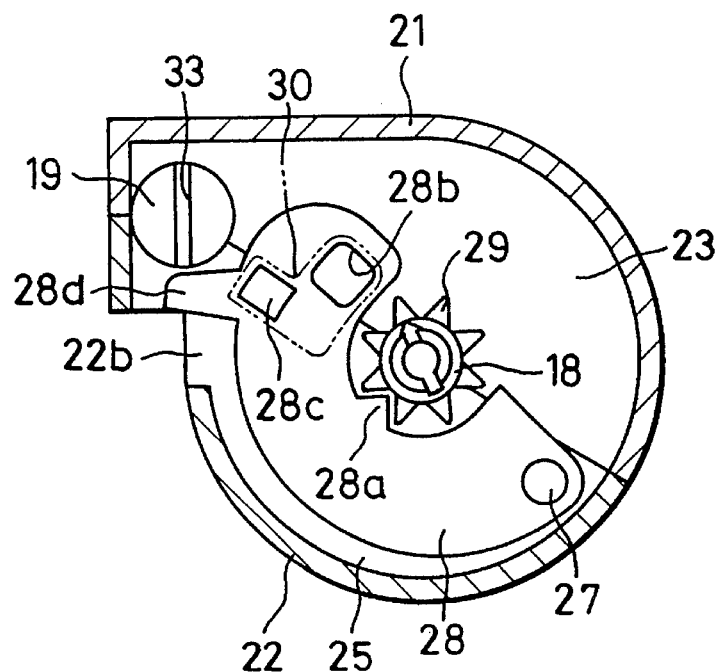
FIG. 5A is a cross section illustrating the cassette in which a spool stands latched by the stopper lever.

There are formed partitions 23 and 24 on the upper shell half 21 and partitions 25 and 26 on the lower shell half 22. The stopper lever 28 is contained in a latching chamber defined by the partitions 23 and 25 and end walls 21a and 22a of the shell halves 21 and 22, and is supported on a shaft 27 rotatably. While the photo film cassette 20 is outside the housing 3, the stopper lever 28 is in a latching position illustrated in FIG. 5A, where a claw 28a on the stopper lever 28 is in mesh with a gear 29 fixed, or formed, on the spool 18, so as to keep the spool 18 rotationally fixed. While the stopper lever 28 is in an unlatching position illustrated in FIG. 5B, the claw 28a is retracted from the gear 29, so as to allow the spool 18 to rotate. Note that the gear 29 has eight teeth so that the spool 18 as latched can have eight rotational positions.

The stopper lever 28 has a driven recess 28b, with which the engaging pin 15c is engaged. When the lock slider 15 slides, the stopper lever 28 is rotated around the shaft 27. Near the driven recess 28b is formed a protrusion 28c. While the stopper lever 28 is in the state of FIG. 5A, the protrusion 28c is fitted in an access opening 30 formed in the end walls 21a and 22a, so as to retain the stopper lever 28. While the stopper lever 28 is in the state of FIG. 5B, the protrusion 28c is located between the end wall 22a and the partition 25, so as to hold the stopper lever 28. While the spool 18 is unlatched rotationally, a projection 28d formed on the stopper lever 28 is projected outward through an opening 22b in the lower shell half 22. The inside of the cassette containing chamber 8 has a groove 8d, which receives the projection 28d. The projection 28d operates so that, while the spool 18 is unlatched, the projection 28d is stopped by the groove 8d from exiting so as to prevent the cassette 20 from being drawn out of the cassette containing chamber 8. Note that the partitions 23 and 25 shield the inside from ambient light which may pass through the opening 22b or 30, so that the photo film 12 is protected from being fogged by the light.

Figure 6A:
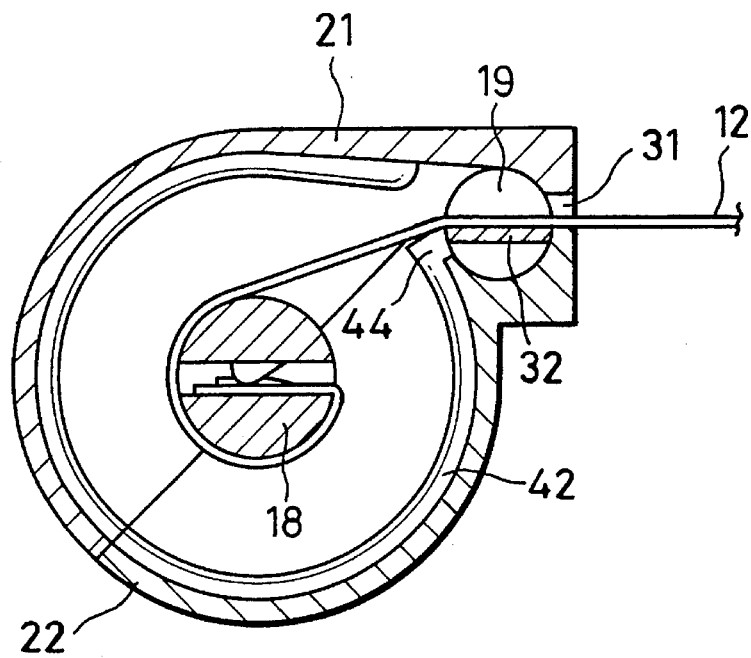
FIG. 6A is a cross section illustrating the cassette in which a shutter plate is open, while a photo film is advanced.
Figure 6B:
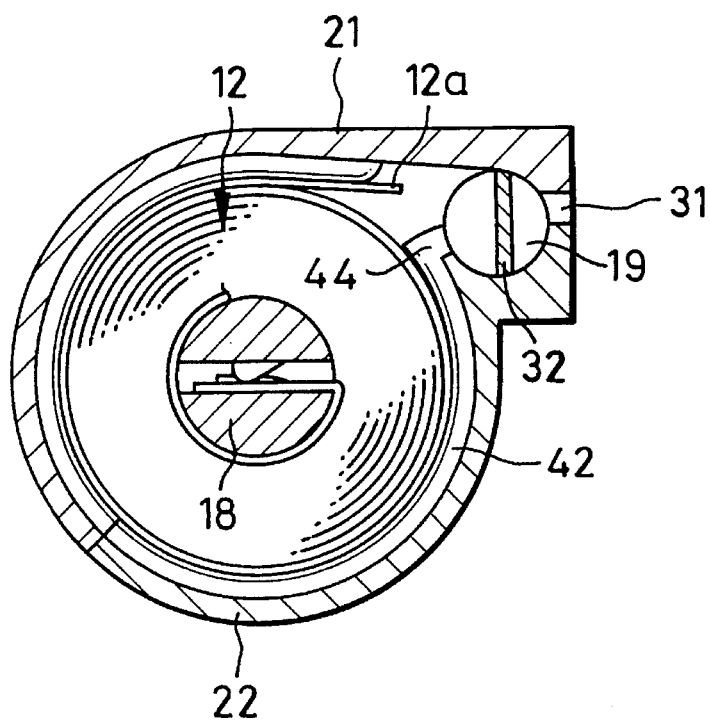
FIG. 6B is a cross section illustrating the cassette in which the shutter plate is closed.

Between the shell halves 21 and 22 is formed the passage port 31. The shutter plate 19 is rotatably mounted in the passage port 31, and is constituted of a plate portion 32 and axial ends 19a and 19b. While the shutter plate 19 is in the rotational position of FIG. 6A, the plate portion 32 extends along the passage port 31 so as to open the passage port 31 externally. While the shutter plate 19 is in the rotational position of FIG. 6B, the plate portion 32 is extends across the passage port 31 so as to close the passage port 31 in light-tight fashion. The axial ends 19a and 19b appears externally through the respective end faces of the cassette shell 11. An engaging groove 33 is formed in the axial end 19b. The engaging groove 33 is engaged with the engaging end 16c of the rear lock bar 16 on the bottom lid 9a. When the rear lock bar 16 rotates, the shutter plate 19 is rotated.

Figure 7:
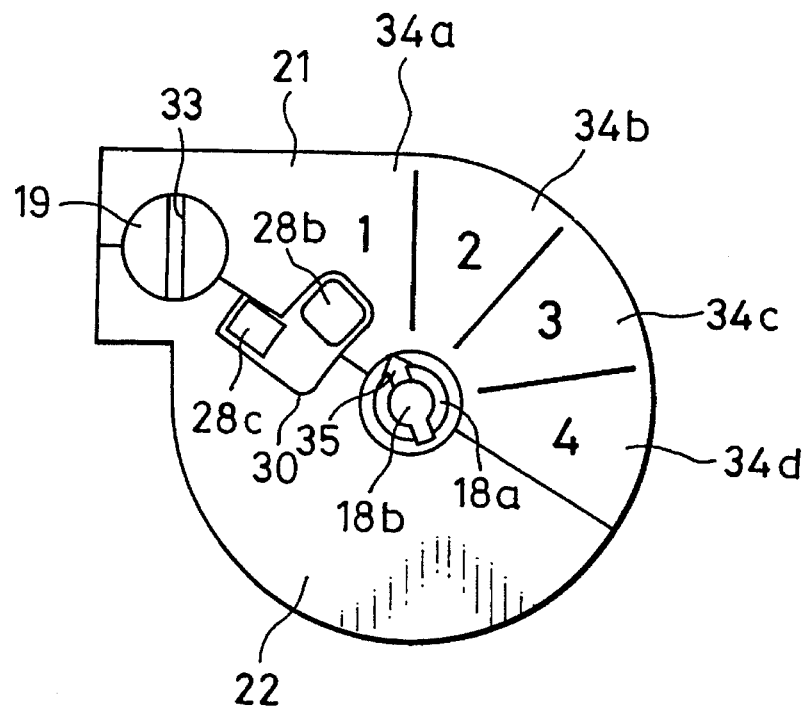
FIG. 7 is a side elevation illustrating the cassette having a structure for indicating a status of use of the photo film.

As illustrated in FIG. 7, the end wall 21a of the upper shell half 21 is provided with an indication marking 34 for representing the status of use of the photo film 12. The indication marking 34 is constituted of four indicative areas 34a to 34d having respective numerical signs 1, 2, 3 and 4. Sign 1 represents a Completely Unexposed Status of the photo film 12. Sign 2 represents a Partially Exposed Status where the photo film 12 has been exposed to have frames but has an available unexposed portion. Sign 3 represents a Completely Exposed Status where the photo film 12 after exposures has no available unexposed portion. Sign 4 represents a Developed Status of the photo film 12. An axial end 18a of the spool 18 has the pointer 35 mounted thereon to point to a selected one of Signs 1 to 4. The spool 18 is driven and stopped in a selected position so that the pointer 35 points to one of Signs 1 to 4. The axial end 18a has an engaging recess 18b, which is engaged with the key shaft 17c of the central lock bar 17, so as to determine the position of the pointer 35 externally.

Before the photo film 12 is exposed, the pointer 35 points to Sign 1 in the area 34a. The cassette 20 must be inserted in the main body 4 before the photo film 12 can be completely exposed and be unloaded from the main body 4 with the cassette shell 11. To unload the cassette 20, the locking end 17a of the central lock bar 17 is rotated by use of the wheel 17b, and is set at the notch 10b in the bottom plate 7. The bottom lid 9a thus unlocked. In the meantime, the spool 18 is rotated via the engagement between the key shaft 17c and the engaging recess 18b. The pointer 35 thus rotated and caused to point Sign 3 in the area 34c.

Figure 2:
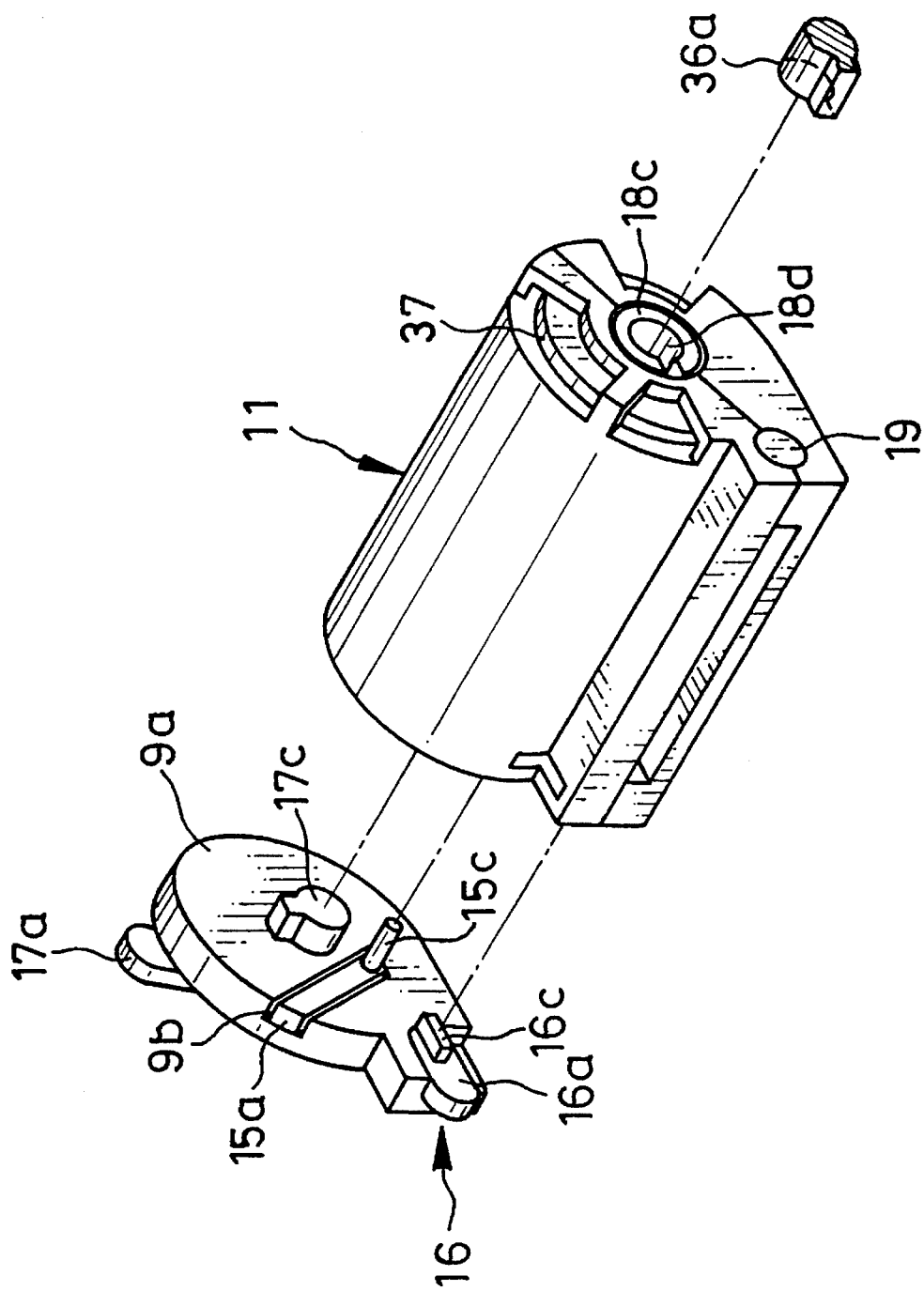
FIG. 2 is a perspective view illustrating a photo film cassette with a bottom lid both to be used in the photo film unit in FIG. 1.
Figure 8:
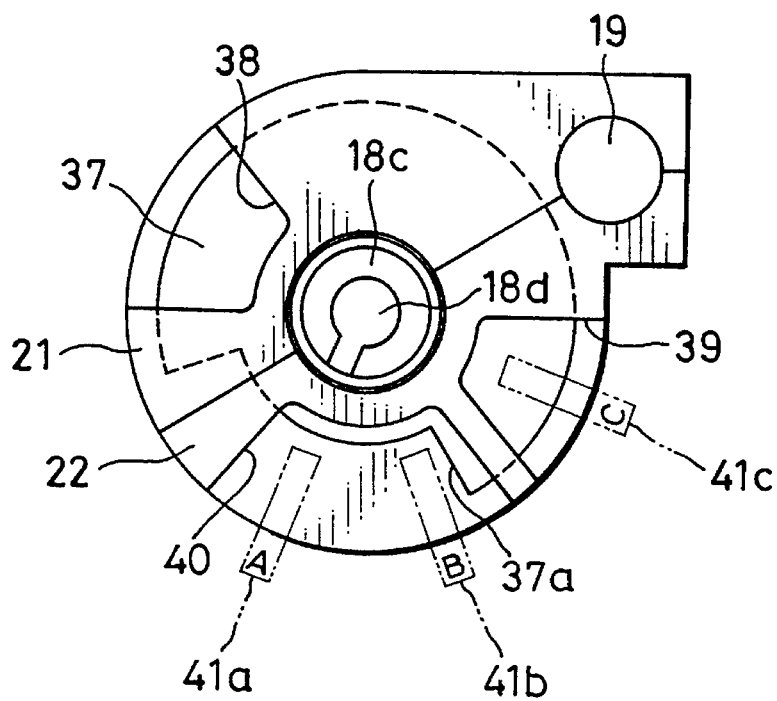
FIG. 8 is a side elevation illustrating the cassette, in opposition to FIG. 7, having a structure for signaling the status of use of the photo film.

As illustrated in FIG. 2, another axial end 18c of the spool 18 has an engaging recess 18d, which is engaged with a drive shaft 36a of an operable wheel 36 for winding the photo film 12. Operation of the drive shaft 36a rotates the spool 18, so as to wind the photo film 12 into the cassette shell 11. On the axial end 18c is formed a disk 37 integrally. The disk 37 is positioned outside the partitions 24 and 26 and inside end walls 21b and 22c of the respective shell halves 21 and 22. As illustrated in FIG. 8, an opening 38 is formed in the end wall 21b. Openings 39 and 40 are formed in the end wall 22c. The disk 37 partially appears externally through the openings 38 to 40. Note that the partitions 24 and 26 shield the inside from ambient light which enters through the openings 38 to 40, so that the photo film 12 is protected from being fogged by the light.

On the disk 37 is formed a bar code (not shown) representing information inclusive of the sensitivity, the latitude, the number of available imaging frames of the photo film 12. In the disk 37 is formed a sectorial signaling recess 37a. The opening 38 is used for allowing access of an optical bar-code reader, which is incorporated in an external optical instrument treating the cassette 20, such as a camera, photo film processor, and a photo printer. The bar-code reader reads the bar code from the disk 37 to detect the photo film information. The openings 39 and 40 are used to allow access of contact sensors 41a, 41b and 41c, which are incorporated in an inspecting device and/or external optical instrument treating the cassette. Each of the sensors 41a to 41c is biased by use of a spring to press the disk 37, and when contacting the disk 37, is turned OFF, and when received in the signaling recess 37a, is turned ON.

Because the disk 37 rotates together with the spool 18, the status of use of the photo film 12 can be detected automatically by checking the position of the signaling recess 37a electrically or photoelectrically by the sensors 41a to 41c. The information of the present status of use can be used for judgment as to whether the cassette 2 is usable in the photo film processor or printer.

Table 1 as below illustrates the possibility of use of loading the external optical instruments with the cassette 20.

TABLE 1

|  | Photo Film Status | |
| --- | --- | --- |
|  | Completely Exposed (3) | Developed (4) |
| Photo Film Processor | Loadable | Unadaptable |
| Printer | Unadaptable | Loadable |
| Photo Film Video Player | Unadaptable | Loadable |

Note that, in Table 1, a "photo film processor" is an instrument which is loaded with the cassette containing the exposed photo film, which pulls the photo film from out of the cassette shell, and which develops the photo film automatically. A "photo film video player" is an instrument for picking up an image on the photo film after development to display a positive image of the image from the photo film on a CRT. Such a photo film video player is similar to a photo printer in that they are loaded with the photo film cassette containing developed photo film.

Table 2 illustrates the combinations of signals from the sensors 41a to 41c detecting the signaling recess 37a, according to a three-bit system. The sensors 41a to 41c are represented by Positions A, B and C in FIG. 8.

TABLE 2

|  |  | 3-bit System | | |
| --- | --- | --- | --- | --- |
|  |  | A | B | C |
| Film Status | Completely Unexposed (1) | o | o | o |
|  | Completely Exposed (3) | x | x | o |
|  | Developed (4) | x | x | x |

As is understood from Table 2, the three-bit system is available for detecting the status of the photo film 12 in the cassette 20 among the Unexposed, Partially Exposed, Completely Exposed and Developed Statuses. The o's in Table 2 represent a lack of the signaling recess 37a in opposition to the associated sensor. The x's represent detection of the signaling recess 37a in opposition to the associated sensor.

Table 3 below illustrates positions of contact sensors required practically for the external optical instruments, in view of preventing an erroneous loading operation of the cassette for the purpose of inhibiting double exposure.

TABLE 3

| | Sensor Position(s) |
|---|---|
| Photo Film Processor | A & C |
| Photo Printer | C |
| Photo Film Video Player | C |

As is understood from Table 3, arrangement of the single sensor 41c at C is sufficient, except for the photo film processor requiring the two sensors 41a and 41c at A and C. According to Table 3, the use of the sensor 41a at A judges whether or not the photo film 12 has begun to be used. The use of the sensor 41c at C judges whether the photo film 12 is developed or not developed yet.

The operation of the above construction is described now. In the course of assemblage of the housing 3 of the photo film unit in a darkroom, it is loaded with the cassette 20. Before inserting the cassette 20, the shutter plate 19 is rotated in the open position of FIG. 6A. The photo film 12 is fully drawn out of the cassette shell 11, while wound to be the roll. The stopper lever 28 is retained in the latching position of FIG. 5A. The spool 18, in completing the cassette 20, is rotationally positioned so as to direct the pointer 35 to point to Sign 1 in the area 34a of the indication marking 34 to indicate the Completely Unexposed Status of the photo film 12.

The bottom lid 9a is fitted on the cassette shell 11. Initially, the bottom lid 9a is regulated so that: the locking end 15a of the lock slider 15 is kept flush with the periphery of the bottom lid 9a ; the pin 15c is positioned at the driven recess 28b in the stopper lever 28; the engaging end 16c of the rear lock bar 16 is directed receivably in the engaging groove 33 in the shutter plate 19; the locking end 16a is projected toward the supply chamber 13; and the key shaft 17c of the central lock bar 17 is directed receivably in the engaging recess 18b. The bottom lid 9a is engaged with the cassette shell 11 by engaging carefully the lock slider 15, and the lock bars 16 and 17 respectively with the stopper lever 28, the shutter plate 19, and the spool 18.

Figure 5B:
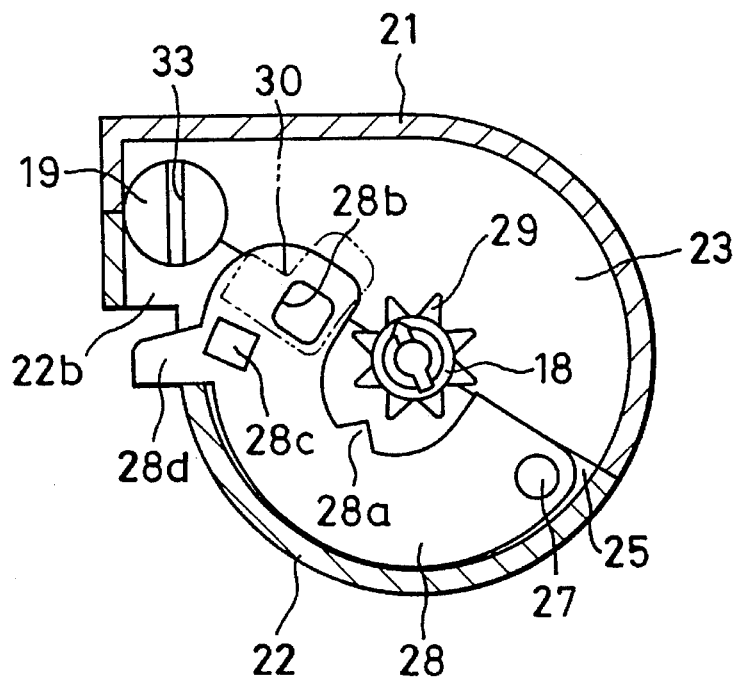
FIG. 5B is a cross section illustrating the cassette in which the spool stands unlatched.

The main body 4, before mounting the bottom plate 7, open at the bottom. The cassette shell 11, together with the bottom lid 9a and the photo film 12, are inserted into the bottom of the main body 4, while inserting the cassette shell 11 into the cassette containing chamber 8, and the roll of the photo film 12 into the supply chamber 13. After such insertion, the bottom plate 7 is closed, and fixed on the main body 4, e.g. welded by the application of ultrasonic wave. The enclosure of the bottom plate 7 retains the locking ends 16a and 17a in the spacing 14 between the main body 4 and the bottom plate 7, so that the bottom lid 9a is never, and will never be, dropped from the main body 4. The operable projection 15b is then slid by use of a jig, so as to fit the locking end 15a into the groove 8b. The stopper lever 28 engaged with the engaging pin 15c is rotated around the shaft 27. The projection 28a, as in FIG. 5B, is disengaged from the mesh with the gear 29 so as to unlatch the spool 18. The protrusion 28c comes between the partition 25 and the end wall 22a of the shell half 22, so as to retain the stopper lever 28 in the unlatching position. The projection 28d on the stopper lever 28 is projected through the opening 22b and fitted into the groove 8d, so as to retain the cassette shell 11 inside the cassette containing chamber 8.

Figure 9:
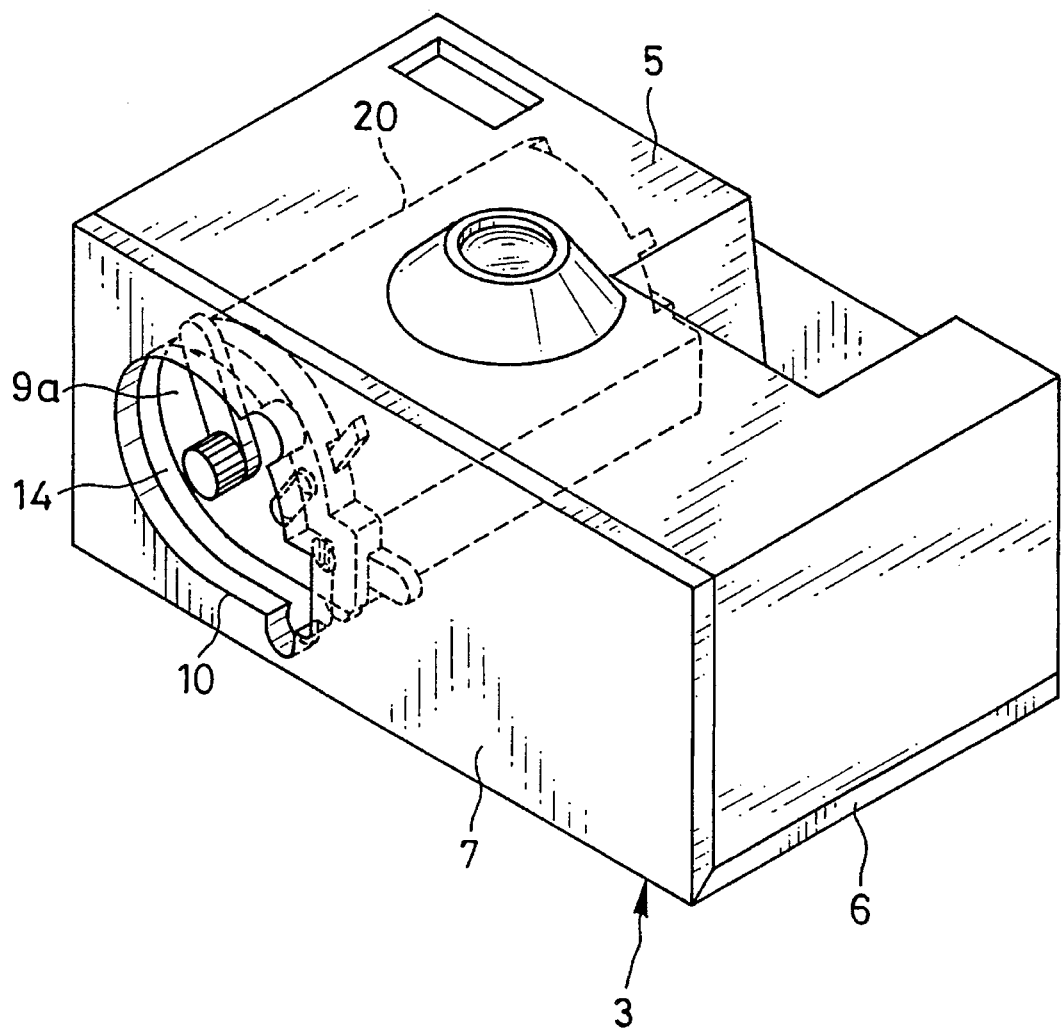
FIG. 9 is a perspective view illustrating the photo film unit as loaded with the cassette.

The housing 3 of the photo film unit is assembled as illustrated in FIG. 9. The housing 3 is packaged in a cardboard packaging with decorative and informative printing. The cardboard packaging, as is known to public, has to appear externally, so that the photo film unit is usable for photography without removing the cardboard packaging. The winding wheel 36 is operated after each exposure of imaging frames. The drive shaft 36a is driven and rotates the spool 18 inside the cassette shell 11, so as to wind an exposed portion of the photo film 12 into the cassette shell 11. In the course of photography, a final frame is exposed. Then the winding wheel 36 is fully rotated, so as to wind the entirety of the photo film 12 into the cassette shell 11 after completion of photography.

The photo film unit after photography is forwarded to a photo laboratory, where the cardboard packaging is removed. The cassette 20 is removed from the housing 3. The removal of the cassette 20 is performed in an illuminated room. Before opening the bottom lid 9a, the bottom lid 9a is unlocked from the main body 4. The wheel 17b on the central lock bar 17 is rotated until the locking end 17a is aligned with the notch 10b of the opening 10 in the bottom plate 7. The spool 18, engaged at the engaging recess 18b with the key shaft 17c, is rotated together. With the locking end 17a at the notch 10b, the pointer 35 on the spool 18 points to Sign 3 in the area 34c to indicate the Completely Exposed Status of the photo film 12. Note that the leading end 12a of the photo film 12 is positioned within the cassette shell 11 to stand by for easily being exited from the cassette shell 11.

Then the operable projection 15b of the lock slider 15 is slid by use of a jig, and retracted within the bottom lid 9a so as to release the retention at the locking end 15a. The stopper lever 28 is moved by the engagement of the engaging pin 15c and the driven recess 28b, rotationally around the shaft 27, until the projection 28a comes into engagement with the gear 29. The protrusion 28c is fitted in the access opening 30, and retains the stopper lever 28. The projection 28d is retracted from the groove 8d and released from retention inside the cassette containing chamber 8. The spool 18 is thus latched and stopped from rotating. The pointer 35 is fixedly held while pointing to Sign 3 in the area 34c to indicate a Completely Exposed Status of the photo film 12.

The groove 16b in the rear lock bar 16 is rotated by a jig or screwdriver, to rotate the locking end 16a, which is engaged with the groove 8c and in the position of the notch 10a. The shutter plate 19, driven via the engagement of the engaging end 16c and the engaging groove 33, is rotated to the closed position of FIG. 6B, so as to close the passage port 31 in light-tight fashion. Then the bottom lid 9a is released from all the lock mechanisms inclusive of the lock slider 15 and lock bars 16 and 17.

With the wheel 17b pinched, the bottom lid 9a is pulled out and removed from the cassette 20, which is next removed from the main body 4. The passage port 31 in the removed cassette 20 is blocked from ambient light by the shutter plate 19, so that the photo film 12 is protected from being fogged. The pointer 35 is kept in a position pointing at Sign 3 in the area 34c with the spool 18 latched, by the virtue of the central lock bar 17 and the lock slider 15, and is prevented from being moved from this position. The disk 37, rotatable with the spool 18, is stopped in the position in FIG. 8. When the cassette 20 is inspected in an external inspecting device having the three sensors 41a, 41b and 41c, only the two sensors 41a and 41b detect the existence of the signaling recess 37a, so that the inspecting device detects the Completely Exposed Status of the photo film 12, similar to recognition of Sign 3. Due to this sensed state the cassette 20 can be loaded into a photo film processor, but can be presented from being loaded into a camera, photo printer or photo film video player. The photo film 12 after exposure is thus reliably prevented from being damaged inadvertently.

Note that, as is understood from Table 3, a photo film processor, which can inspect the status of use of the photo film, can have the two sensors 41a and 41c only in the respective positions A and C. A photo printer or photo film video player, inspecting the photo film status, can have the single sensor 41c only in the position C.

The cassette 20, now containing the exposed photo film 12, is loaded into the photo film processor, in which the stopper lever 28 is released by a release mechanism incorporated in it. The photo film processor also rotates the shutter plate 19 toward the open position. A drive shaft is engaged with the spool 18, and rotates the spool 18 in the unwinding direction. The ridges 42 and 43 inside the cassette shell 11 contact on the outer turn of the roll of the photo film 12 and thus keep the roll from loosening. The photo film 12 rotates together with the spool 18. The separator claws 44 and 45, in the innermost position in the passage port 31, abut on the leading end 12a of the photo film 12, separate the leading end 12a from the inner roll of the photo film 12, and direct the leading end 12a to the outside through the passage port 31. The photo film 12, partially exited, is taken up by a take up device in the procession, drawn out of the cassette shell 11, and developed in processing steps.

The photo film 12, after the development, is wound back into the cassette shell 11. The photo film processor checks the rotational position of the spool 37 by detecting the signaling recess 37a at the sensors 41a to 41c. The spool 18 is automatically controlled so as to direct the pointer 35 to point at Sign 4 in the area 34d indicating the Developed Status of the photo film 12. After this, the photo film processor displaces the stopper lever 28 to latch the spool 18.

The disk 37, rotatable with the spool 18, is thus stopped from rotating. When the cassette 20 is inspected in an external device having the three sensors 41a, 41b and 41c, all the sensors 41a to 41c detect the existence of the signaling recess 37a, so that the inspecting device detects the Developed Status of the photo film 12, similar to recognition of Sign 4. In this state the sensors indicate that the cassette 20 can be loaded into a photo printer or photo film video player.

The three lock structures, in the present invention, must be all released from retention before the bottom lid 9a can be open. This construction is also advantageous in that, while at least a portion of the photo film 12 is protruded and exited from the cassette shell 11, the bottom lid 9a is prevented from being opened. This is because the portion of the photo film 12, existing through the passage port 31 at the shutter plate 19, hinders the shutter plate 19 from being closed completely. The shutter plate 19, tightly engaged with the rear lock bar 16, cannot come to the closed position so as to hinder the rear lock bar 16 from coming to the position fully released from retention on the bottom plate 7.

In the above embodiment, the bottom plate 7 is formed integrally with the rear cover 6. Alternatively a bottom plate may be formed integrally with a front cover of a housing of photo film unit.

In the above embodiment, the locking ends 17a and then 15a are disengaged before the locking end 16a is disengaged. Alternatively the locking end 16a may be disengaged before disengagement of the locking end 15a, and may be disengaged before that of the locking end 17a.

In the above embodiment, the openings 39 and 40 for the signaling recess 37a are formed for the external access in Positions A, B and C associated with the signaling recess 37a. Alternatively such openings for the sensor access may be formed differently, e.g. a single greater opening for the three positions, otherwise two openings only for Positions A and C, may be formed.

In the above embodiment, gear 29 has the eight teeth. The indicative areas 34a to 34d and Positions A to C are arranged at the angular pitch of one eighth of a single revolution. Alternatively the number of teeth around a gear latched by the stopper lever 28, and/or a pitch of indicative areas and sensor-access positions associated with the signaling recess 37a, may be determined differently.

In the above embodiment, the bottom of the photo film unit has the three operable members inclusive of the lock slider 15 and the lock bars 16 and 17. Alternatively, the bottom of the photo film unit may have a single operable member, which when operated, may cause one or more structures to operate, firstly to lock/unlock a bottom lid, secondly to latch/unlatch a spool, thirdly to set the spool rotationally for the selected indication. In response to unlocking the bottom lid to be open, the spool may stand latched while be set for indicating the Completely Exposed Status.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention as defined by the claims, they should be construed as included therein.

What is claimed is:

1. A lens-fitted photo film unit including a housing with a photographing mechanism, a cassette containing chamber formed in said housing, a cassette pre-loaded in said cassette containing chamber, and a photo film supply chamber for containing a roll of unexposed photo film drawn out of said cassette; said cassette including a cassette shell, a spool on which a trailer of said photo film is retained, and a photo film passage port; wherein shutter means is disposed in said passage port, and when in a closed state, said shutter means blocks said passage port to prevent ambient light from entry into said cassette shell, and when in an open state, said shutter means allows said photo film to pass through said passage port; when said spool is rotated in an unwinding direction, a leader of said photo film is exited through said passage port, and after photography, an exposed portion of said photo film is wound into said cassette shell; said lens-fitted photo film unit comprising:

a bottom lid for closing a bottom of said cassette containing chamber in light-tight fashion, said bottom lid being removed from said housing, before said cassette is moved in an axial direction and unloaded from said cassette containing chamber;

first lock means disposed on said bottom lid and being externally operable and displaceable between retaining and unretaining positions, and when in said retaining position, said first lock means contacts a wall of said cassette containing chamber to retain said bottom lid on said housing, and when in said unretaining position, said bottom lid is released from retention on said housing, wherein said first lock means is engaged with said shutter means, and when in said unretaining position, moves said shutter means to said closed state, and when in said retaining position, moves said shutter means to said open state, and said first lock means is operated and displaced to said unretaining position after said photo film is wound into said cassette shell, so as to close said shutter means;

second lock means disposed on said bottom lid, and being externally operable and displaceable between retaining and unretaining positions, and when in said retaining position, said second lock means contacts said wall of said cassette containing chamber to retain said bottom lid on said housing, and when in said unretaining position, said bottom lid is released from retention on said housing; and spool latching means disposed inside said cassette shell and being displaceable between a latching position where said spool is latched relative to said cassette shell, and an unlatching position where said spool is unlatched, wherein said spool latching means is connected to said second lock means, and is displaced to said latching position when said second lock means is in said unretaining position, and is displaced to said unlatching position when said second lock means is in said retaining position.

2. A lens-fitted photo film unit as defined in claim 1, wherein said housing includes:

a main body having said photographing mechanism;

an exposure chamber disposed between said supply chamber and said cassette containing chamber for allowing said photo film to be photographically exposed;

a bottom plate mounted on a bottom of said main body in light-tight fashion for covering said bottom; and a bottom opening formed in said bottom plate under said cassette containing chamber, said bottom lid being inserted through said bottom opening for closing said cassette containing chamber.

3. A lens-fitted photo film unit as defined in claim 2, wherein said cassette shell includes a pair of shell halves formed from plastics.

4. A lens-fitted photo film unit as defined in claim 3, wherein said bottom plate mounted on said main body keeps said first lock means between said main body and said bottom plate, and subsequently external operation displaces said second lock means in said retaining position.

5. A lens-fitted photo film unit as defined in claim 4, wherein a rear cover is secured behind said main body, and said bottom plate is formed on said rear cover integrally in swingable fashion.

6. A lens-fitted photo film unit as defined in claim 5, wherein a front cover is secured in front of said main body, and a photo film winding wheel is disposed on said main body over said cassette containing chamber and connected to said spool of said cassette inside said cassette containing chamber.

7. A lens-fitted photo film unit as defined in claim 3, wherein said shutter means is rotatable, an axial end of said shutter means has an engaging groove formed therein, and said cassette shell has an access hole formed therein for causing said engaging groove to be visible externally;

said first lock means includes a first lock member disposed on said bottom lid in a rotatable manner and engaged with said engaging groove, said first lock member projected beyond a periphery of said bottom opening; and when said photo film unit is assembled, said bottom lid is mounted on said cassette while said shutter means is in said open state, so as to fit said first lock member on said engaging groove through said access hole, said cassette is inserted in said cassette containing chamber before said bottom plate is mounted on said main body and subsequently said first lock member is kept inside said main body by an edge of said bottom opening.

8. A lens-fitted photo film unit as defined in claim 7, wherein said bottom opening has a notch shaped in correspondence with an end of said first lock member while in said unretaining position, and before unloading said cassette, said first lock member is drawn out of said bottom plate through said notch.

9. A lens-fitted photo film unit as defined in claim 8, wherein said shutter means comprises a plate which is erected across said passage port when in said closed state, and is laid along said passage port when in said open state.

10. A lens-fitted photo film unit as defined in claim 3, wherein said spool latching means includes: a movable stopper member mounted in said cassette shell; a gear portion disposed around a core of said spool; and a projected portion disposed on said stopper member, to be engaged with said gear portion to latch said spool when said stopper member is moved to said latching position, and to be disengaged from said gear portion to unlatch said spool when said stopper member is moved to said unlatching position;

an access opening is formed in said cassette shell for causing said stopper member to be visible externally;

said second lock means includes a second lock member disposed on said bottom lid in a moveable fashion and connected to said stopper member through said access opening, said second lock member, when moved, moving said stopper member from said latching position to said unlatching position and projecting beyond a periphery of said bottom opening; and when said photo film unit is assembled, said bottom lid is mounted on said cassette while said spool is in said latched position, so as to fit said second lock member on said stopper member through said access opening; said cassette is inserted in said cassette containing chamber before said bottom plate is mounted on said main body; and subsequently said second lock member is moved to move said stopper member to said unlatching position.

11. A lens-fitted photo film unit as defined in claim 10, wherein, before unloading said cassette, said second lock member is moved inward from said periphery of said bottom opening, to move said stopper member to said latching position.

12. A lens-fitted photo film unit as defined in claim 11, wherein a driven recess is formed in said stopper member, said driven recess receives said second lock member through said access opening, and when an edge of said driven recess is pressed, said stopper member is moved.

13. A lens-fitted photo film unit as defined in claim 2, further comprising:

third lock means disposed on said bottom lid, and being externally operable and displaceable between retaining and unretaining positions, and when in said retaining position, said third lock means contacting a periphery of said bottom opening to retain said bottom lid on said bottom plate, and when in said unretaining position, said bottom lid is released from retention on said bottom opening, said third lock means is engaged with an axial end of said spool, and when displaced, said third lock means transmits rotation to said spool; and indicator means disposed on an end face of said cassette and being directed to said bottom lid, said indicator means being provided for said spool and said cassette shell, for indicating a status of use of said photo film, said indicator means including: a pointer; and a plurality of indicative areas for representing graded statuses of use of said photo film, to be pointed by said pointer, one of said indicative areas being pointed to by said pointer in accordance with displacement of said third lock means.

14. A lens-fitted photo film unit as defined in claim 13, wherein an engaging recess is formed in said axial end of said spool and appears outside said cassette shell;

said third lock means includes a third look member disposed on said bottom lid in a rotatable manner, engaged with said engaging recess, and projected beyond a periphery of said bottom opening; and when said photo film unit is assembled, said bottom lid is mounted on said cassette while said third lock member is in said retaining position, so as to fit said third lock member on said engaging recess; said cassette is inserted in said cassette containing chamber before said bottom plate is mounted on said main body; and subsequently said third lock member is kept on said main body by said periphery of said bottom opening.

15. A lens-fitted photo film unit as defined in claim 14, wherein said bottom opening has a notch shaped in correspondence with an end of said lock member while in said unretaining position, and before unloading said cassette, said lock member is drawn out of said bottom plate through said notch.

16. A lens-fitted photo film unit as defined in claim 13, wherein said displacement of said third lock means rotates said spool to cause said pointer to point to said one indicative area; and subsequently said spool is latched by said spool latching means so as to keep said one indicative area pointed.

17. A lens-fitted photo film unit as defined claim 16, wherein said third lock means is displaceable rotationally, and a direction in which said third lock means is displaced toward said unretaining position is set to be a rotational direction of winding said photo film into said cassette shell; and before unloading said cassette, external operation displaces said third lock means to said unretaining position, and subsequently displaces said second lock means to said unretaining position.

18. A lens-fitted photo film unit as defined in claim 17, wherein said indicative areas includes at least an unexposed state and representing an unexposed status and an exposed state area representing an exposed status of said photo film, and when said third lock means is in said unretaining position, said pointer points to said exposed state area.

19. A lens-fitted photo film unit as defined in claim 18, further comprising signaling means for signaling a rotational position of said spool externally, said rotational position representing said status of use of said photo film.

20. A lens-fitted photo film unit as defined in claim 19, wherein said pointer is disposed on said spool, and said indicative areas are formed on said cassette shell.

21. A lens-fitting photo film unit as defined in claim 20, wherein said signaling means includes:

a rotary plate disposed on said spool at an axial end of said spool opposite to said indicator means;

an opening formed in said cassette shell for causing said rotary plate to be visible externally; and a recess formed in said rotary plate and appearing through said opening to render a position of said rotary plate readable externally.

22. A lens-fitted photo film unit including a housing with a photographing mechanism, a cassette containing chamber formed in said housing, a cassette pre-loaded in said cassette containing chamber, and a photo film supply chamber for containing a roll of unexposed photo film drawn out of said cassette; said cassette including a cassette shell, and a spool on which a trailer of said photo film is retained; wherein after photography, an exposed portion of said photo film is wound into said cassette shell; said lens-fitted photo film unit comprising:

a bottom lid for closing a bottom of said cassette containing chamber in light-tight fashion, said bottom lid being removed from said housing, before said cassette is moved in an axial direction and unloaded from said cassette containing chamber;

lock means disposed on said bottom lid, and being externally operable and displaceable between retaining and unretaining positions, and when in said retaining position, said lock means contacting a wall of said cassette containing chamber to retain said bottom lid on said housing, and when in said unretaining position, said bottom lid being released from retention on said housing, said lock means engaged with an axial end of said spool, said lock means transmits rotation to said spool when said lock means is displaced from the retaining position to the unretaining position or from the unretaining position to the retaining position; and indicator means disposed on an end face of said cassette and being directed to said bottom lid, said indicator means being provided for said spool and said cassette shell, for indicating a status of use of said photo film, said indicator means including: a pointer; and a plurality of indicative areas for representing graded statuses of use of said photo film, to be pointed to by said pointer, one of said indicative areas being pointed to by said pointer in accordance with displacement of said lock means.

23. A lens-fitted photo film unit as defined in claim 22, wherein when said spool is rotated in an unwinding direction, a leader of said photo film is exited through said passage port in said cassette shell.

24. A lens-fitted photo film unit as defined in claim 23, further comprising:

spool latching means disposed inside said cassette shell and being displaceable between a latching position where said spool is latched relative to said cassette shell, and an unlatching position where said spool is unlatched; and operable means disposed on said bottom lid and being externally operable, and connected to said spool latching means, external operation causing said operable means to displace said spool latching means between said latching position and said unlatching position.

25. A lens-fitted photo film unit as defined in claim 24, wherein said indicative areas include at least areas representing an unexposed status and an unexposed status of said photo film, and when said lock means is in said unretaining position, said pointer points said exposed state indicating area.

26. A lens-fitted photo film unit including a housing with a photographic mechanism, a cassette pre-loaded in said cassette containing chamber, and a photo film supply chamber for containing a roll of unexposed photo film drawn out of said cassette, said cassette including a cassette shell, and a spool on which a trailer of said photo film is retained, wherein after photography, an exposed portion of said photo film is wound into said cassette shell, said lens-fitted photo film unit comprising:

signaling means, provided in said cassette, for signaling a rotational position of said spool externally one of before and after said cassette stands loaded in said cassette containing chamber, said rotational position representing a status of use of said photo film, a bottom lid for closing a bottom of said cassette containing chamber in light-tight fashion, said bottom lid being removed from said housing, before said cassette is moved in an axial direction and unloaded from said cassette containing chamber;

spool latching means disposed inside said cassette shell and being displaceable between a latching position where said spool is latched relative to said cassette shell, and an unlatching position where said spool is unlatched; and operable means disposed on said bottom lid and being externally operable, and connected to said spool latching means, external operation causing said operable means to displace said spool latching means between said latching position and said unlatching position.

27. A lens-fitted photo film unit as defined in claim 26, wherein when said spool is rotated until said signaling means is set in a predetermined rotational position, said spool is latched by said spool latching means so as to keep said signaling means set in a constant manner.

28. A lens-fitted photo film unit as defined in claim 27, wherein said signaling means includes:

a rotary plate disposed in said cassette loaded in said cassette containing chamber and on said spool at an axial end of said spool and being directed upward;

an opening formed in said cassette shell for causing said rotary plate to appear externally; and a recess formed in said rotary plate and being visible through said opening to have a position readable externally while said cassette stands unloaded.

29. A lens-fitted photo film unit as defined claim 28, wherein at least an unexposed status and an exposed status of said photo film are representable by use of said externally readable position of said recess in said rotary plate.

30. A photo film cassette for use with a lens-fitted photo film unit, comprising:

a cassette shell in which a roll chamber and a photo film passage port are formed;

a spool contained rotatably in said cassette shell for winding unexposed photo film;

shutter means disposed in said passage port and being rotatable, said shutter means, when in a closed state, blocking said passage port to prevent ambient light from entry into said cassette shell, and when in an open state, allowing said photo film to pass through said passage port; and spool latching means disposed inside said cassette shell and being displaceable between a latching position where said spool is latched relative to said cassette shell, and an unlatching position where said spool is unlatched, wherein said spool latching means is connected to an externally operable member of said photo film unit while loaded in said photo film nit, said spool latching means being displaced when said operable member is operated;

indicator means disposed on an end face of said cassette shell and being directed to a bottom of said photo film unit, said indicator means being provided for said spool and said cassette shell, for indicating a status of use of said photo film, said indicator means including a pointer and a plurality of indicative areas for representing graded statuses of use of said photo film, to be pointed at by said pointer; and said photo film unit including:

a bottom lid for closing a bottom of a cassette containing chamber in light-tight fashion, said bottom lid being removed from a housing, before said cassette shell is moved in an axial direction and unloaded from said cassette containing chamber; and lock means disposed on said bottom lid, and being externally operable and displaceable between retaining and unretaining positions, and when in said retaining position, said lock means contacting a wall of said cassette containing chamber to retain said bottom lid on said housing, and when in lid unretaining position, said bottom lid released from retention on said housing, said lock means engaged with an axial end of said spool, said lock means transmitting rotation to said spool when said lock means is displaced from the retaining position to the unretaining position or from the unretaining position to the retaining position, one of said indicative areas being pointed in accordance with displacement of said lock means.

31. A photo film cassette as defined in claim 30, further comprising signaling means for signaling a rotational position of said spool externally, said rotational position representing said status of use of said photo film.

* * * * *